(No Model.)
C. F. CHEW.
PORTABLE TURN TABLE.
No. 288,408. Patented Nov. 13, 1883.
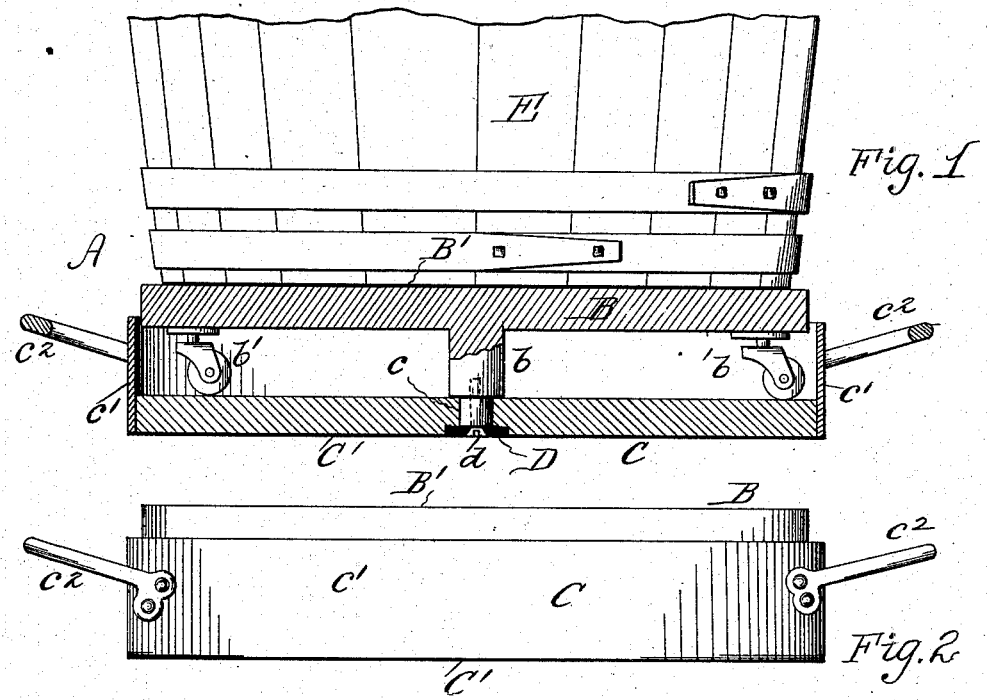
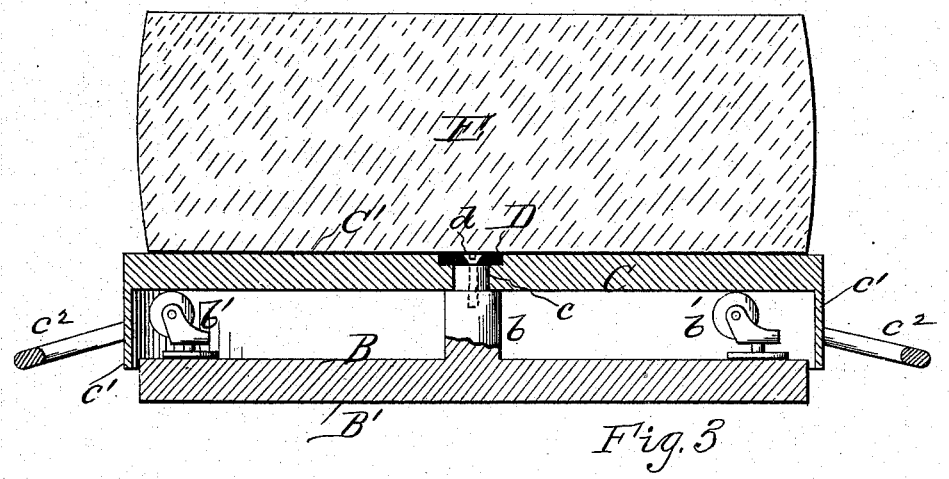
WITNESSES:
C. W. Williams
Wm. VanHorn
INVENTOR,
Charles F. Chew
By S. J. VanStavoren
ATTORNEY

UNITED STATES PATENT OFFICE.

CHARLES F. CHEW, OF PHILADELPHIA, PENNSYLVANIA.

PORTABLE TURN-TABLE.

SPECIFICATION forming part of Letters Patent No. 288,402, dated November 13, 1883.

Application filed August 15, 1883. (No model.)

*To all whom it may concern:*

Be it known that I, CHARLES F. CHEW, a citizen of the United States, residing at Philadelphia, in the county of Philadelphia and State of Pennsylvania, have invented certain new and useful Improvements in Portable Turn-Tables, of which the following is a specification, reference being had therein to the accompanying drawings, wherein—

Figure 1 is a transverse vertical section of my invention. Fig. 2 is an elevation, and Fig. 3 is a transverse section illustrating the invertibility of my improved portable turn-table or platform.

My invention has for its object to provide a simple, inexpensive, portable, and invertible turn-table or platform for holding and exhibiting firkins of lard or butter, cheese, or other articles of merchandise, whereby both the turn-table and the article supported thereby may be moved together from place to place in a store or establishment, as desired, without necessitating the removal of one from the other or the handling of each separately, and also whereby either the top or base side of the table may at will be utilized for its upper side, so that when the latter becomes roughened and defaced by use it may be inverted to form the base side of the platform or table, and a new or undefaced side presented for the reception of the article to be supported thereby.

My invention accordingly consists of the combination, construction, and arrangement of parts comprising a portable and invertible turn-table, as hereinafter more specifically described and claimed.

In the drawings, A represents the turn-table, composed of two parts, B and C. The former consists of a circular plate having a central pivot, $b$, and casters or rollers $b'$ located near its periphery, and the latter of a correspondingly-configured plate having a central aperture, $c$, for the reception of the end of the pivot $b$, and a peripheral flange, $c'$, with handles $c^2$ $c^2$. The pivot $b$ is held in aperture $c$ by means of a screw, $d$, and washer D, thereby securing the parts B and C together without interfering with their rotary movement. When the parts B and C are arranged as shown in Fig. 1, the former supports the firkin or other article, E, and forms the revolving platform, and the latter is the base therefor; but when the turn-table is inverted, as illustrated in Fig. 3, then the part B forms the base and the part C the revolving platform of the table A. The feature of invertibility of the latter provides two sides or surfaces B' and C', either of which may be the upper or platform side upon which the article is placed, so that when one of said sides becomes defaced or scored and fouled by cutting butter, cheese, or other like article thereon, it may be inverted to form the base or lower side of the table, and cause the latter to present a new or clean upper side for the reception of the goods to be placed thereon. The handles $c^2$ $c^2$ are provided to afford means for taking hold of the table while the firkin or other article, E, is in position thereon, so that both the table and article may be moved together, when a change of location is desired, thereby avoiding the necessity of handling each separately. The flange $c'$ incloses the casters or rollers $b'$ and plate B, so as to prevent the entrance of dirt or other substances between the parts B and C.

If desired, the pivot $b$ and the casters $b'$ may be formed on the part C, in which case the part B will consist merely of a disk with central aperture. Again, the flange $c'$ may be formed separately from disk C, as shown in Fig. 1, or integrally therewith, as indicated in Fig. 3. In either case said plate or disk C is of a larger diameter than that of plate B, so that the latter rotates within the former to provide a compact and simple turn-table.

What I claim is—

1. The portable and invertible turn-table A, having part B, with pivot $b$ and rollers or casters $b'$, and the part C, with apertures $c$, flange $c'$, and handles $c^2$, substantially as shown and described.

2. The portable and invertible turn-table A, composed of two plates or disks, B C, flange $c'$, handles $c^2$, and interposed rollers $b'$, substantially as shown and described.

3. The portable and invertible table A, composed of a revolving plate, B, and a flanged plate, C, the latter being of a greater diameter than that of the former, so as to inclose it and the casters or rollers $b'$ and pivot $b$, substantially as shown and described.

4. The combination of plate B, having pivot $b$ and rollers $b'$, the plate C, having aperture $c$, flange $c'$, and handles $c^2$, and the means for connecting pivot $b$ to plate C, substantially as shown and described.

5. A turn-table composed of two parts, constructed and arranged for operation substantially as shown and described, whereby it may be inverted, as set forth.

In testimony whereof I affix my signature in presence of two witnesses.

CHARLES F. CHEW.

Witnesses:
  S. J. VAN STAVOREN,
  CHAS. F. VAN HORN.